United States Patent [19]

Pascor

[11] 4,000,907
[45] Jan. 4, 1977

[54] CHUCKS FOR MACHINE TOOLS, SUCH AS LATHES AND GRINDING MACHINES

[75] Inventor: Michel Pascor, Orleans, France

[73] Assignee: Equipements de Machines-Outils Spemo, Nanterre, France

[22] Filed: Jan. 20, 1975

[21] Appl. No.: 542,426

[30] Foreign Application Priority Data

Feb. 1, 1974 France .................... 74.03394

[52] U.S. Cl. .............................. 279/121
[51] Int. Cl.² ........................ B23B 31/16
[58] Field of Search .......... 279/121, 110, 123; 408/158

[56] References Cited

UNITED STATES PATENTS

| 948,449 | 2/1910 | Hurlbut | 279/110 |
|---|---|---|---|
| 1,219,083 | 3/1917 | Church | 279/121 |
| 3,515,400 | 6/1970 | Jendry | 279/121 |

*Primary Examiner*—Leonidas Vlachos
*Assistant Examiner*—Z. R. Bilinsky
*Attorney, Agent, or Firm*—Young & Thompson

[57] ABSTRACT

The invention provides a chuck for a machine tool, the frame of the chuck having mounted thereon clamping jaw guides supporting jaws for gripping a workpiece or a tool. An axially displaceable central cam support is disposed in the frame and can cooperate with the clamping jaw guides to displace the same radially. The cam support comprises pivots having double lateral flats forming radially projecting male ramps fitting inside corresponding female guide ramps formed in the clamping jaw guides. Advantageously the clamping jaw guides are mounted on the frame to slide between radial shims and means are provided to retain the shims against the clamping jaw guides.

2 Claims, 6 Drawing Figures

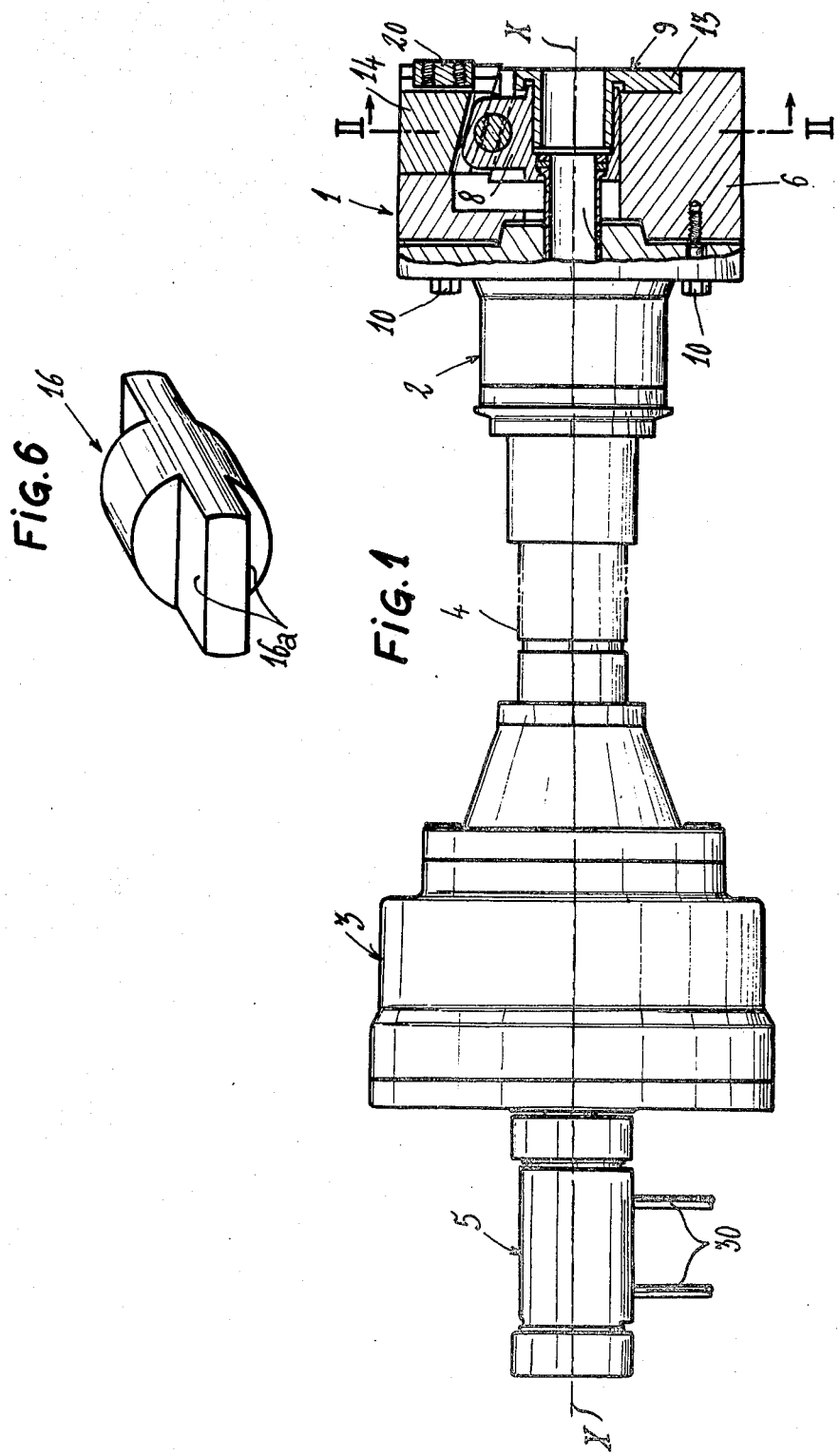

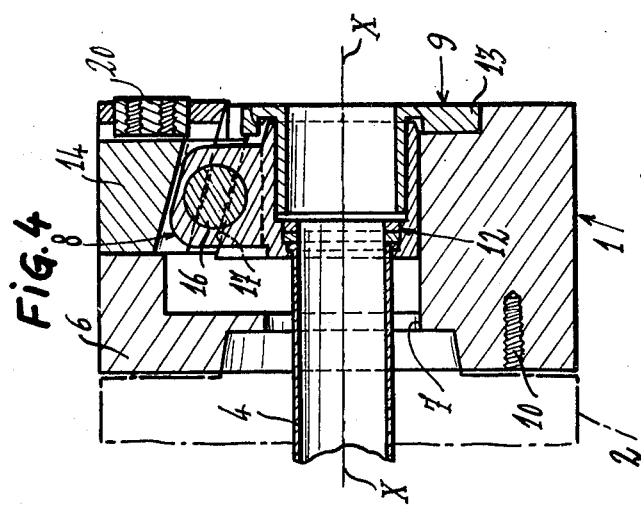
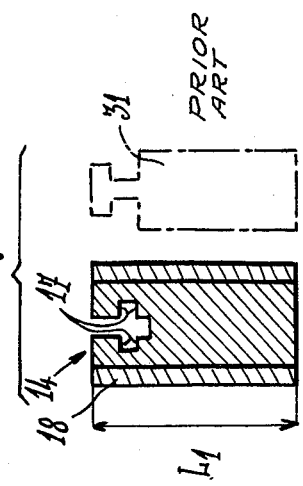
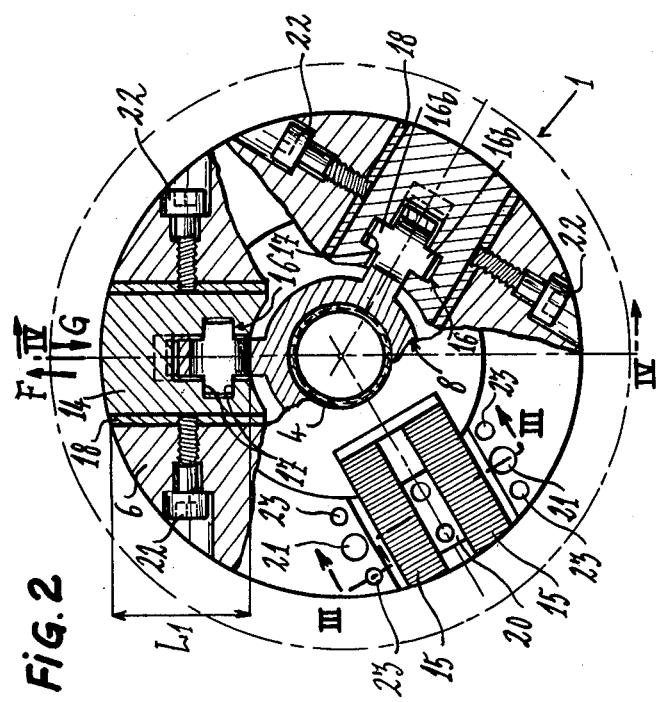
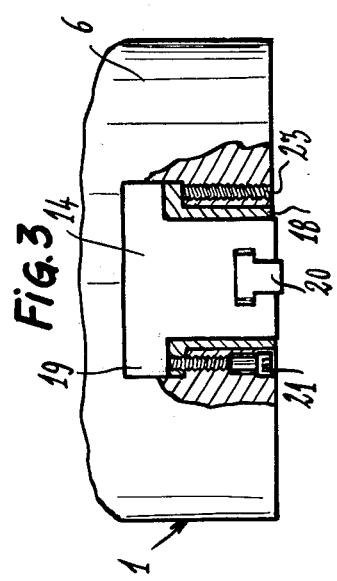

CHUCKS FOR MACHINE TOOLS, SUCH AS LATHES AND GRINDING MACHINES

This invention relates to a chuck for a machine tool such as a lathe, grinding machine or the like. Machine tools of the kind specified of course comprise a generally cylindrical chuck which is attached to a rotary spindle of a lathe or grinding machine or the like, or is fixed on a table of a milling or drilling machine or the like. The chuck can, therefore, be fixed or rotary and generally has three, sometimes two, radially disposed members known as clamping jaw guides. The clamping jaw guides receive jaws which are adapted to retain a workpiece to be machined or a tool axially by clamping on the outside or inside.

The invention relates more particularly to a chuck of the kind specified in which a central member which cooperates with the clamping jaw guides and is displaceable axially enables the clamping jaw guides to be actuated radially with synchronisation. Such a central member is referred to hereinafter as a "cam support". The cam support is connected to an axial tube actuated by a control means such as a hydraulic, pneumatic or electric actuator or electrical or mechanical device.

In a prior art embodiment, the control link between the cam support and the clamping jaw guides takes the form of generally T or L-section male ramps which form an integral part of the clamping jaw guides and fit into matching female ramps in the cam support. It is found that in operation the clamping jaw guides do not always stand up satisfactorily to the very heavy stressing which they undergo due to their reduced guide length on the chuck, and this may be harmful to the continued precision and life of the chuck.

Another disadvantage has also been observed, namely that, since the clamping jaw guides fit into hollows made in the inside of the chuck frame, the tolerances required for such hollows are very close and, therefore, it is very difficult and expensive to produce them by machining. However, the precision and life of a chuck depends inter alia on the guide length of the clamping jaw guides and on the clearance between the clamping jaw guides and the chuck frame.

It is an object of the invention to overcome or at least obviate the aforementioned disadvantages, inter alia by considerably increasing the mechanical resistance of the clamping jaw guides to the stressing which they experience in operation.

The invention provides a chuck for a machine tool such as a lathe or grinding machine, adapted to be attached to a rotary spindle or fixedly mounted, which chuck comprises a frame on which clamping jaw guides are mounted supporting jaws for gripping a workpiece to be machined or a tool, and an axially displaceable central cam support which is disposed in the frame and which can cooperate with the clamping jaw guides to displace the same radially, the cam support comprising pivots having double lateral flats forming radially projecting male ramps fitting inside corresponding female guide ramps with which the clamping jaw guides are formed.

The lateral flats on the cam support pivots ensure contact with the female ramps over almost the whole of the respective facing surfaces. The arrangement also considerably increases the radial guide length of the clamping jaw guides.

In a preferred embodiment of the invention, the chuck has shims disposed radially between the chuck frame and the clamping jaw guides, the shims being normally retained by a set of adjustable screws extending through the chuck frame. The system of shims and adjustable screws enables the hollows into which the clamping jaw guides fit to be machined with substantially wider tolerances than those required in the aforementioned prior art construction.

For a better understanding of the present invention, reference will now be made, by way of example, to the accompanying drawings, in which:

FIG. 1 shows a partially sectioned elevational view of a chuck according to the invention and the control members thereof, FIG. 2 shows a partial cross-sectional view along line II—II of FIG. 1, FIGS. 3 and 4 show sectional views along lines III—III and IV—IV of FIG. 2, FIG. 5 shows longitudinal sectional views through a clamping jaw guide of the chuck of FIGS. 1 to 4 and a clamping jaw guide associated with the prior art chuck, and FIG. 6 shows a perspective view, to an enlarged scale, of a pivot forming part of the cam of the chuck of FIGS. 1 to 4.

Referring now to the drawings, in the embodiment illustrated in FIGS. 1 to 4, the chuck 1 according to the invention is cylindrical, having an axis X—X, and being attached to a machine tool, namely a lathe. The lathe comprises a spindle 2 which supports the chuck 1 and will be borne by a frame (not shown). The spindle 2 is connected to a control actuator 3 of the chuck 1 via a connecting tube 4, and a double rotary connection 5 adjacent the actuator 3 supplies fluid to the actuator 3 via ducts 30. The assembly formed by the aforementioned members forms a cylinder of revolution around the axis X—X, and the double acting actuator 3 can be hydraulic or pneumatic or can be replaced by an electric device.

The chuck 1 will now be described with reference more particularly to FIGS. 2 to 6. The chuck comprises a frame 6 of cylindrical outline which is attached by screws 10 to the spindle 2. The chuck is formed with an axial bore 7 through which the tube 4 extends whose end is connected through an axial cam support 8 via a nut and lock-nut system 12. A tubular centering member 9 guides the cam support 8. The member 9 is also connected to the frame 6 via an end collar 13 engaging in a hollow in the frame 6. The cam support 8 can slide axially between the centering member 9 and the frame 6 by means of the tube 4, which can be actuated by the double acting actuator 3.

The chuck 1 also comprises clamping jaw guides 14 (three in the embodiment illustrated) which slide in the frame 6. The clamping jaw guides 14 are partly fitted inside the frame 6 opposite the cam support 8 and are offset by 120°. Two rows 15 of grooves with which their surfaces are formed and with which are associated T pieces 20 enable jaws (not shown) adapted to clamp the tool or workpiece to be machined to be suitably positioned on the clamping jaw guides 14.

According to the invention, the cam support 8 comprises cylindrical pivots 16 having double lateral flats 16a (see FIG. 6). The flats project radially and fit inside female ramps 17 with which the clamping jaw guides 14 are formed. Thus, associated with each clamping jaw guide 14 are two double flats 16a forming a male ramp adapted to slide in the female ramp 17 when the tube 4 is displaced axially. Preferably, the female ramps 17 are slightly inclined in relation to the axis X—X, for example by about 10° to 15° (see FIG. 4).

According to another feature of the invention, the clamping jaw guides 14 are mounted on the frame 6 to slide between radial L-shaped shims 18 bearing against shoulders 19 of the clamping jaw guides 14 (see FIG. 3) and a system of screws 21 to 23 extending through the frame 6 retains the shims 18 adjustably against the clamping jaw guides 14. The screws 21 and 22, disposed perpendicularly to one another, retain the shims 18 axially and radially, while the screws 23, which are parallel with the screws 21 and the axis X—X, enable the clamping of the shims 18 against the shoulders 19 of the clamping jaw guides 14 to be adjusted.

The clearance of the clamping jaw guides 14 is occasionally adjusted if it is found that the clearance between the clamping jaw guide 14 and the chuck frame 6 is excessive. To this end, the retaining screws 21 and 22 are loosened, then by means of the screws 23, by acting on the shims 18, the clearance between the clamping jaw guides 14 and the chuck frame 6 is adjusted. Then the screws 21 and 22 are re-tightened.

During operations of the cam support 8, the clamping jaw guides 14 are guided over almost the whole of their length $L_1$ (see FIG. 5).

This embodiment of the clamping jaw 14 comprising female ramps 17 increases the guide length in comparison with the clamping jaw guide 31 of prior art kind shown in chain-dot lines in FIG. 5. As already mentioned, the increase in the guide length of the clamping jaw guides 14 enables their mechanical resistance to torque stressings undergone in operation to be substantially increased. Moreover, these arrangements substantially improve the precision of positioning of the clamping jaw guides 14.

As a result of the double flats 16a, the pivots 16 can be adjusted angularly in the female ramps 17. Such angular adjustment ensures improvement contact between the flats 16a and the ramps 17 and at the same time reduces the fatigue of such members in operation. The shims 18 enable the clearance between the clamping jaw guides 14 and the chuck frame 6 to be taken up, thus simplifying the machining of such members by allowing wider tolerances than the prior art constructions, whilst ensuring outstanding behaviour in operation and having the advantage of increasing the precision of the chuck. By way of example, the clearance can reach about 0.01 mm without in these conditions adversely affecting the precision of the positioning of the clamping jaw guides 14 in the frame 6.

The provision of shims, as shims 18 (advantageously made of specially treated very hard steel) also enables the chuck frame to be made of cast iron instead of steel as in the case of the prior art chucks, so that the hollows are produced during casting. The selection of the material, for instance spheroidal graphite cast iron, obviates the thermal treatments which such members require if made from steel. As a result the risks can be eliminated which are inherent in treating the highly elaborated member at a very advanced stage of machining.

The invention is not limited to the embodiment described and can comprise variants. For instance, the ramps 17 can have a different section, for instance an L-section or triangular section, and their inclination can be substantially varied.

I claim:

1. A chuck for a machine tool comprising a frame mounted on a spindle with an axis of rotation, a cam support mounted for sliding movement in said frame parallel to said axis, clamping jaw guides mounted on said frame for radial sliding movement relative to said axis and guided along substantially their entire length, said guides carrying female ramps on opposite sides of each of a plurality of portions of said cam support, said ramps being inclined in relation to said axis, means for sliding said cam support parallel to said axis, and means carried by said cam support radially to displace said jaw guides, said radial displacing means comprising cylindrical pivots mounted for rotation in and relative to said portions of said cam support about axes transverse to said spindle axis, each said pivot having double lateral flats projecting on opposite sides of each of said portions of said cam support into said female ramps and in sliding engagement therewith, said lateral flats being disposed within the projected cylindrical contour of the associated said cylindrical pivots.

2. The chuck of claim 1 and a tubular member connected to the frame via an end collar, said cam support being mounted for movement on said member parallel to said spindle axis.

* * * * *